US008244452B2

(12) United States Patent
Judd et al.

(10) Patent No.: US 8,244,452 B2
(45) Date of Patent: Aug. 14, 2012

(54) SYSTEMS AND METHODS INTEGRATED AIR TRAFFIC CONTROL MANAGEMENT

(75) Inventors: Thomas D. Judd, Woodinville, WA (US); Thomas F. McGuffin, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 336 days.

(21) Appl. No.: 12/633,918

(22) Filed: Dec. 9, 2009

(65) Prior Publication Data

US 2011/0133980 A1 Jun. 9, 2011

(51) Int. Cl.
*G06F 19/00* (2011.01)

(52) U.S. Cl. ................ 701/120; 700/2; 700/83; 700/86; 700/79; 700/17; 359/634

(58) Field of Classification Search .................. 701/120; 700/2, 83, 86, 79, 17; 359/634
See application file for complete search history.

(56) References Cited

U.S. PATENT DOCUMENTS

| | | | | |
|---|---|---|---|---|
| 6,313,759 | B1 | 11/2001 | Musland-Sipper | |
| 6,353,779 | B1 | 3/2002 | Simon | |
| 6,946,976 | B1 * | 9/2005 | Langner et al. | 340/971 |
| 7,495,602 | B2 | 2/2009 | Sandell et al. | |
| 7,647,139 | B2 | 1/2010 | Sandell | |
| 7,835,316 | B2 | 11/2010 | McGuffin et al. | |
| 2007/0126621 | A1 | 6/2007 | Sandell et al. | |
| 2007/0129854 | A1 | 6/2007 | Sandell et al. | |
| 2009/0117895 | A1 | 5/2009 | McGuffin | |
| 2009/0258643 | A1 | 10/2009 | McGuffin | |
| 2010/0023247 | A1 * | 1/2010 | Sandell et al. | 701/120 |

FOREIGN PATENT DOCUMENTS

| | | |
|---|---|---|
| EP | 2109087 | 10/2009 |
| WO | 2007064733 | 6/2007 |

OTHER PUBLICATIONS

Condis, "Standards for Seamless ATS Communications Transition Between Different Datalink Technologies", Mar. 19, 2010, pp. 1-7.
Sandell, "ATN Datalink on Boeing Airplanes", "Link 2000+ Incentives Workshop", Oct. 10-11, 2007, pp. 1-15, Publisher: The Boeing Company.

(Continued)

*Primary Examiner* — Thomas Black
*Assistant Examiner* — Luke Huynh
(74) *Attorney, Agent, or Firm* — Fogg & Powers LLC

(57) ABSTRACT

Systems and methods for integrated air traffic control management are provided. In one embodiment, a system comprises a first processing system including a FANS application for implementing a CPDLC and AFN system; a second processing system including an ATN application for implementing a PM-CPDLC and CM system; a third processing system implementing a HMI, the HMI configured to provide access to a first set of pages driven by the FANS application and a second set of pages driven by the ATN application; and an ATC Manager accessed from the HMI, the HMI configured to provide access to a third set of pages driven by the ATC manager, wherein the third set of pages selectively directs a user of the HMI to either the first set of pages or the second set of pages based on a selected ATC center.

17 Claims, 3 Drawing Sheets

OTHER PUBLICATIONS

Sandell, "Datalink on the 787 Airplane", "ATN 2005", Sep. 20, 2005, pp. 1-42, Publisher: The Boeing Company, Published in: London.
Judd et al., "Systems and Method for Managing Controller Pilot Data Link Communication (CPDLC) Systems", "U.S. Appl. No. 12/268,284, filed Oct. 7, 2011," pp. 1-26.
Judd et al, "Systems and Methods for Managing Non-Integrated Controller Pilot Data Link Communications (CPDLC) Systems on an Aircraft", "U.S. Appl. No. 12/888,499, filed Sep. 23, 2010", pp. 1-19.
"PM-CPDLC Validation Report", Apr. 29, 2005, pp. 1-12, Publisher: Aeronautical Communications Panel—Working Group N.
Bousquie, Jean-Francois, "Data Link Communications: Operational & Human Factors Considerations", "Proceedings of Digital Avionics Systems Conference", Nov. 1999, pp. 5.C.4-1 thru 5.C.4-8, Publisher: IEEE, Published in: St. Louis, MO.
European Patent Office, "European Search Report", Mar. 11, 2011, Published in: EP.

* cited by examiner

SYSTEMS AND METHODS INTEGRATED AIR TRAFFIC CONTROL MANAGEMENT

BACKGROUND

For aircraft today, two alternate systems are typically utilized by pilots for exchanging air traffic control information with ground stations. One system is referred to as Future Air Navigation System (FANS). Access to the FANS application is provided by a human machine interface. The other system is referred to as Aeronautical Telecommunication Network (ATN). Access to the FANS application is also provided by a human machine interface. Presently, when a pilot enters into a particular air space, they would need to log into that areas air traffic control system, which could be either a FANS system or an ATN system. This decision introduces a point of confusion for the flight crew because they must log into the correct system. Integrating the two different systems however also creates the potential for pilot confusion because they would need to share "alerting" mechanisms that inform a flight crew when an uplink message is received. As such, a pilot may be confused as to which system to log onto and which system to go to after getting an alert.

For the reasons stated above and for other reasons stated below which will become apparent to those skilled in the art upon reading and understanding the specification, there is a need in the art for improved systems and methods for integrated air traffic control management.

SUMMARY

The Embodiments of the present invention provide methods and systems for integrated air traffic control management and will be understood by reading and studying the following specification.

Systems and methods for integrated air traffic control management are provided. In one embodiment, a system comprises a first processing system including a FANS application for implementing a CPDLC and AFN system; a second processing system including an ATN application for implementing a PM-CPDLC and CM system; a third processing system implementing a HMI, the HMI configured to provide access to a first set of pages driven by the FANS application and a second set of pages driven by the ATN application; and an ATC Manager accessed from the HMI, the HMI configured to provide access to a third set of pages driven by the ATC manager, wherein the third set of pages selectively directs a user of the HMI to either the first set of pages or the second set of pages based on a selected ATC center.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide a flight crew with access to Controller Pilot Data Link Communications (CPDLC) and associated logon functionality by integrating access to both Future Air Navigation System (FANS) and Aeronautical Telecommunication Network (ATN) applications through what is referred to herein as an "ATC Manager."

Figure 1:
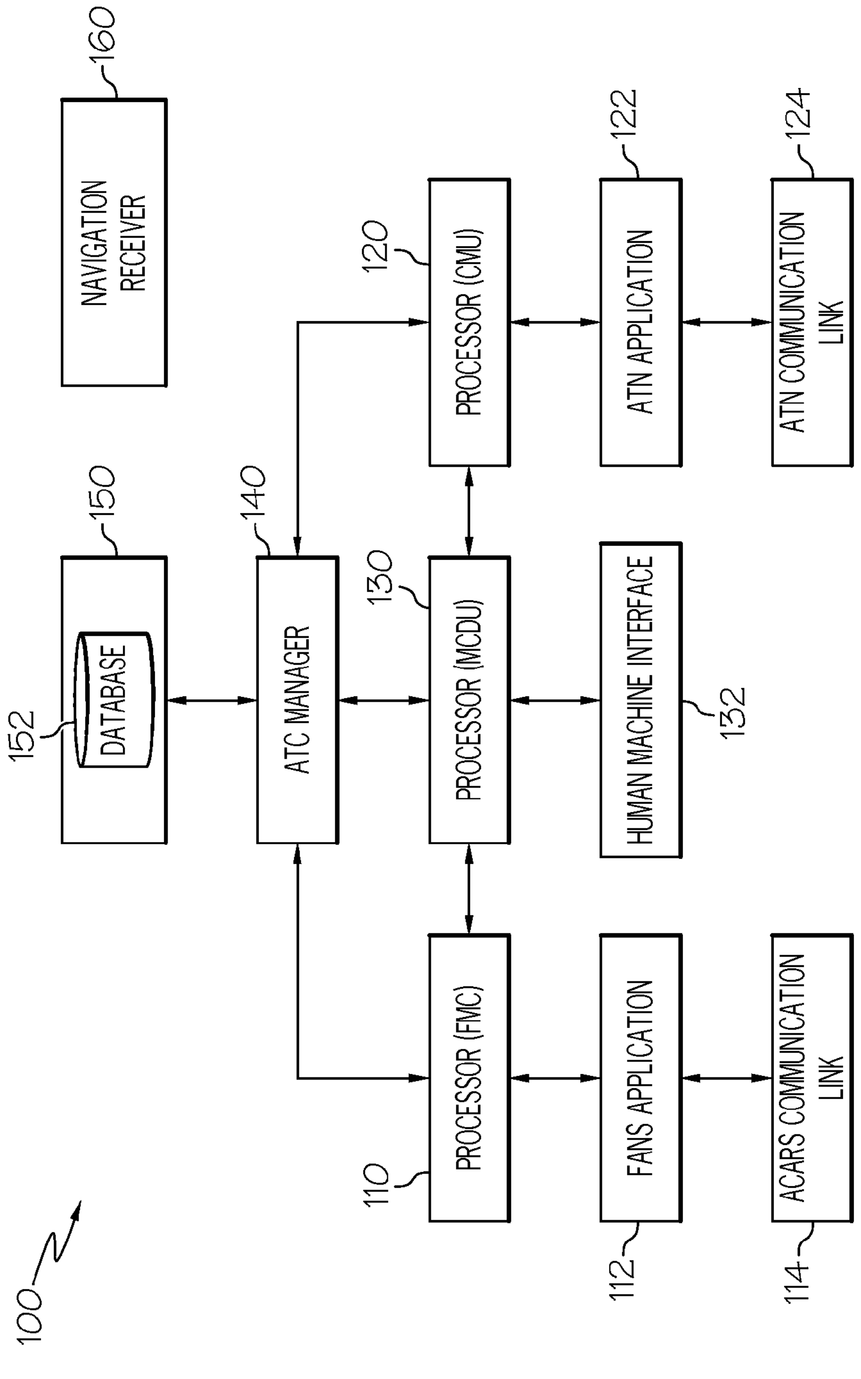
FIG. 1 is a block diagram illustrating a system of one embodiment of the present invention.

FIG. 1 is a block diagram illustrating a system 100 for integrated access to FANS and ATN CPDLC applications. System 100 comprises a first processing system 110 that includes a FANS application 112 for implementing a CPDLC and Aircraft Facility Notification (AFN) system over an Aircraft Communications Addressing and Reporting System (ACARS) communication link 114. In one embodiment, the first processing system 110 comprises an aircraft's Flight Management Computer (FMC) executing the FANS application 112. However, in other embodiments, a processor other than the FMC may be used to implement FANS application 112. Logon functionality to the CPDLC is provided by the AFN. Once logged on, a ground Air Traffic Service Unit (ATSU) will initiate a connection to the aircraft to establish a CPDLC session. The ATSU that initiates the connection to the aircraft may be the same or different than the ATSU the aircraft contacted to log onto.

System 100 further comprises a second processing system 120 including an Aeronautical Telecommunication Network (ATN) application 122 for implementing a Protected Mode Controller Pilot Data Link Communications (PM-CPDLC) and Context Management (CM) system over an ATN communication link 124. In one embodiment, the second processing system 120 comprises an aircraft's Communications Management Unit (CMU) executing an Aeronautical Telecommunication Network (ATN) application 122. However, in other embodiments, a processor other than the CMU may be used to implement ATN application 122. In one embodiment, logon functionality to the PM-CPDLC is provided by the CM application. Once logged on, a ground Air Traffic Service Unit (ATSU) will initiate a connection to the aircraft to establish a PM-CPDLC session. The ATSU that initiates the connection to the aircraft may be the same or different than the ATSU the aircraft contacted to log onto.

System 100 further comprises a third processor 130 coupled to both the FMC 110 and the CMU 120. The third processor 130 implements a Human Machine Interface (HMI) 132 that provides a flight crew user with access to a first set of pages driven by the FANS application 112 and a second set of pages driven by the ATN application 122. In one embodiment, third processor 130 comprises a Multipurpose Control and Data Unit (MCDU).

System 100 further comprises an Air Traffic Control (ATC) manager 140 accessible by the flight crew from the HMI 132. As illustrated in FIG. 1, the ATC Manager 140 is a device independent from the first, second or third processors 110, 120, 130 (such as a fourth processor system, for example). However, in alternate embodiments, ATC Manager 140 may be implemented by any one of the first, second or third processors 110, 120, 130. Alternatively, one or more of the first, second or third processors 110, 120, 130 and/or ATC Manager 140 may be realized as a single physical device. For example, in one embodiment, the first processor 110 and the second processor 120 would be physically realized by a single processor performing the functions described herein of the first processor 110 and the second processor 120.

The HMI 132 provides access to a third set of pages driven by the ATC manager 140. In one embodiment, the third set of pages selectively directs a user of the HMI 132 to information available from either the first set of pages or the second set of pages based on an ATC center selected by the flight crew (or selected by some other means, as discussed below). As the term is used herein "pages" accessed via the HMI 132 refer to visual information physically displayed to a flight crew user (for example, on a screen or alternately on a heads up display). An HMI 132 provided by an MCDU display will also include a series of buttons along both sides of the display whose functions change based on the particular page being displayed. A pilot can enter data into a scratchpad area and direct that data to a particular data entry box on the screen. What information is displayed on the screen, what data can be entered, and the functions of the button for any particular FANS or ATN page is respectively driven by the processor that is executing the FANS or ATN applications 112, 122.

With embodiments of the present invention, a flight crew user wishing to log into an ATC center accesses a login page that is generated by the ATC Manager 140. At the ATC Manager logon page, the flight crew user would enter their login information. In the background, the ATC Manager 140 performs the task of determining whether the flight crew should be logged into the FANS application 112 or the ATN application 122. Based on this determination, the ATC manager 140 provides the users supplied login information to ether the FANS application 112 or the ATN application 122 to logon using the associated logon application with an ATC center. Further, other ATC tasks become necessary, the ATC manager 140 will direct the flight crew user to the appropriate pages (i.e., FANS application 112 driven pages or ATN application 122 driven pages) on the HMI 132 so that the flight crew user does not have to search through different pages to find the information they need.

In one embodiment, the ATC manager 140 queries the flight crew user as to which ATC center to log into. Based on the selected ATC center, the ATC manager 140 directs the flight crew user to either a login page driven by the FANS application 112 or a login page driven by the ATN application 122 to complete the login process. In another embodiment, the ATC manager 140 queries the flight crew user for the ATC center and any additional required login information and then sends that information directly to either the FANS application 112 or the ATN application 122 to complete the login process.

In one embodiment, to identify whether an ATC center selected by the flight crew user is a FANS ATC center or an ATN ATC center, the ATC Manager 140 accesses a database 152 stored on a data storage device 150 that contains a list of ATC centers. Those ATC centers that operate under the ATN system will include an ATN address. Those ATC centers that operate under the FANS system will not include an ATN address. Thus, in one embodiment, when the flight crew user selects an ATC center for login, the ATC Manager 140 concludes that the selected ATC center is an ATN ATC center when the database 152 includes an ATN address for that ATC center. The ATN Manager 140 would then direct the flight crew users to the appropriate pages for accessing the ATN Application 122 system. When the database 152 does not include an ATN address for that ATC center, the ATC Manager 140 concludes that the selected ATC center is a FANS ATC center. The ATN Manager 140 would then direct the flight crew users to the appropriate pages for accessing the FANS application 112 system.

In one embodiment, the HMI 132 provides the flight crew user with a listing of available ATC centers, for example, by a drop down menu. In another embodiment, the system 100 further comprises a navigation receiver 160 (for example, such as a Global Positioning System (GPS) receiver or other Global Navigation Satellite System (GNSS) receiver) and selects an appropriate ATC center for the flight crew based on the current position or flight path of the aircraft. For example, in one embodiment, the database 152 further includes the geographic area assigned to each ATC center and determines when the aircraft is within the geographic area for that ATC center. The ATC Manager 140 can then select the ATC center of the behalf of the flight crew.

Once logged in, the ATC Manager 140, either via the login page or another page driven by the ATC manager 140, provides the flight crew with information as to which CPDLC system is currently in session and any currently established CPDLC links. The ATC Manager 140 would further provide at least one page that tracks alerts and identified for the pilot whether a particular alert was from the FANS application 112 or the ATN application 122.

For example, one purpose of present day CPDLC systems is for communicating air traffic control information previously communicated through VHF voice radio (for example, requests for clearances and grants for clearances). CPDLC replaced the voice communications with canned text/data messages communicated between the flight crew and a ground station. CPDLC messages sent from the ground to an aircraft are referred to as an "uplink" In one embodiment of the present information, the ATC Manager 140 monitors for reception of uplink messages to both the FANS and ATN applications 112, 122. When an CPDLC uplink is received through either system, the ATC Manager 140 alerts the flight crew (by an audible chime, for example) and logs the uplink message on an ATC Manager 140 driven page accessible via the HMI 132. The alert notifies the flight crew to access the ATC Manager 140 page that displays the uplink log. This ATC Manager 140 page, besides logging the uplink message, will indicate which system (FANS or ATN) the uplink was received on. In one embodiment, the ATC Manager 140 will further indicate a push button that takes the flight crew user directly to the appropriate page driven by either the FANS Application 112 or the ATN Application 122 to view the uplink message. In this way, the flight crew user does not need to determine how the uplink was received before they access the message. They are alerted to the arrival of the message by the ATC Manager 140 and are directed to the appropriate page to read the message.

As would be appreciated by one of ordinary skill in the art upon reading this specification, when a flight crew logs in to an ATC center, that logon may be advertised to all ATC centers in a sector, one of which will be selected as the current data authority. Thus it is possible for a flight crew in this way to receive uplink messages from a different ATC center than the particular one that was logged into. Further as a flight crew transitions from one ATC station to the next, the user is not necessarily disconnected from the previous ATC station automatically.

Figure 2:
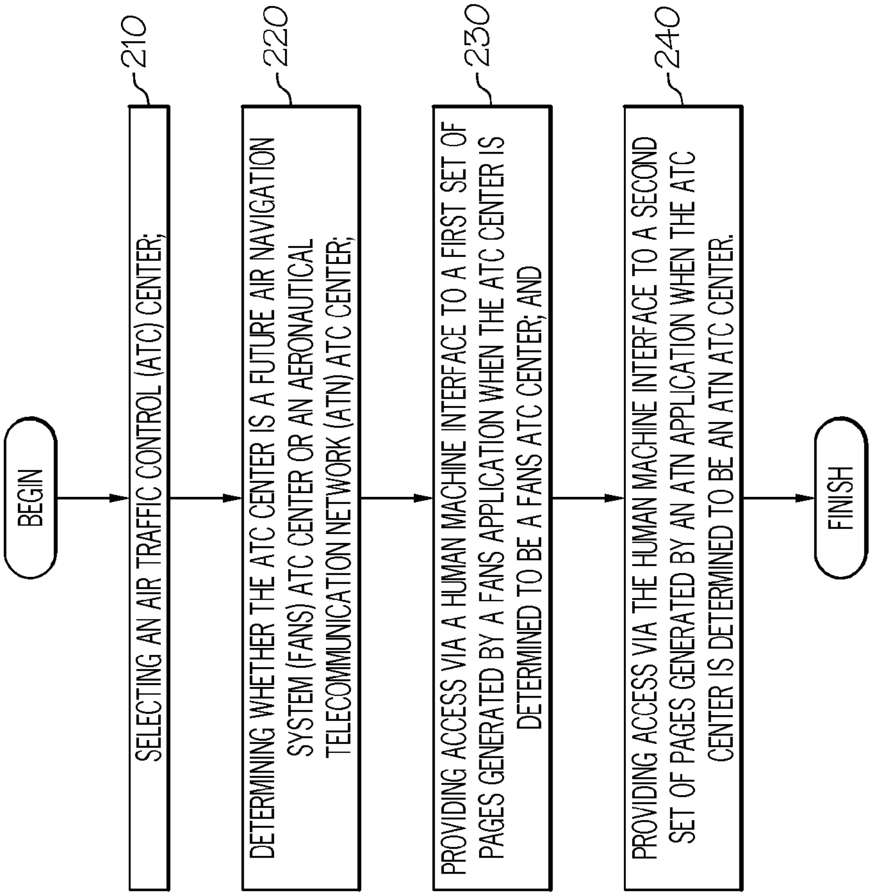
FIG. 2 is a flow chart illustrating a method of one embodiment of the present invention.

FIG. 2 is a flow chart illustrating a method of one embodiment of the present invention for managing access to an Air Traffic Control (ATC) system. The method begins at 210 with selecting an Air Traffic Control (ATC) center. In one embodiment, the ATC is selected by a pilot through a Human Machine Interface. In one embodiment, the HMI provides the flight crew user with a listing of available ATC centers, for example, by a drop down menu. In another embodiment, a navigation receiver (such as a GPS or GNSS receiver) is used to determine an aircraft's position. Once the position is known, an ATC center is selected by the ATC Manager from a database based on the geographic sectors associated with each ATC center listed in the database. The method proceeds to 220 with determining whether the ATC center is a Future Air Navigation System (FANS) ATC center or an Aeronautical Telecommunication Network (ATN) ATC center. In one embodiment, the ATC Manager accesses a database stored on a data storage device that contains a list of ATC centers. Those ATC centers that operate under the ATN system will include an ATN address. Those ATC centers that operate under the FANS system will not include an ATN address. The method proceeds to 230 with providing access via a Human Machine Interface to a first set of pages generated by a FANS application when the ATC center is determined to be a FANS ATC center. When the ATC center selected by the pilot is a FANS ATC center, the ATC Manager directs the flight crew users to the appropriate pages for accessing the FANS application system. The method proceeds to 240 with providing access via the Human Machine Interface to a second set of pages generated by an ATN application when the ATC center is determined to be an ATN ATC center. When the ATC center selected by the pilot is an ATN ATC center, the ATN Manager 140 directs the flight crew users to the appropriate pages for accessing the ATN application system. In one embodiment the method further provides for displaying an uplink message log that selectively directs the user to either an uplink message page for the FANS application or an uplink message page for the ATN application based on whether an uplink CPDLC message was received from a FANS communication link or an ATN communication link. By guiding the flight crew user to the appropriate pages for the selected ATC center, embodiments of the present invention provide for integrated FANS and ATN application access that avoids sources for pilot confusion.

Figure 3:
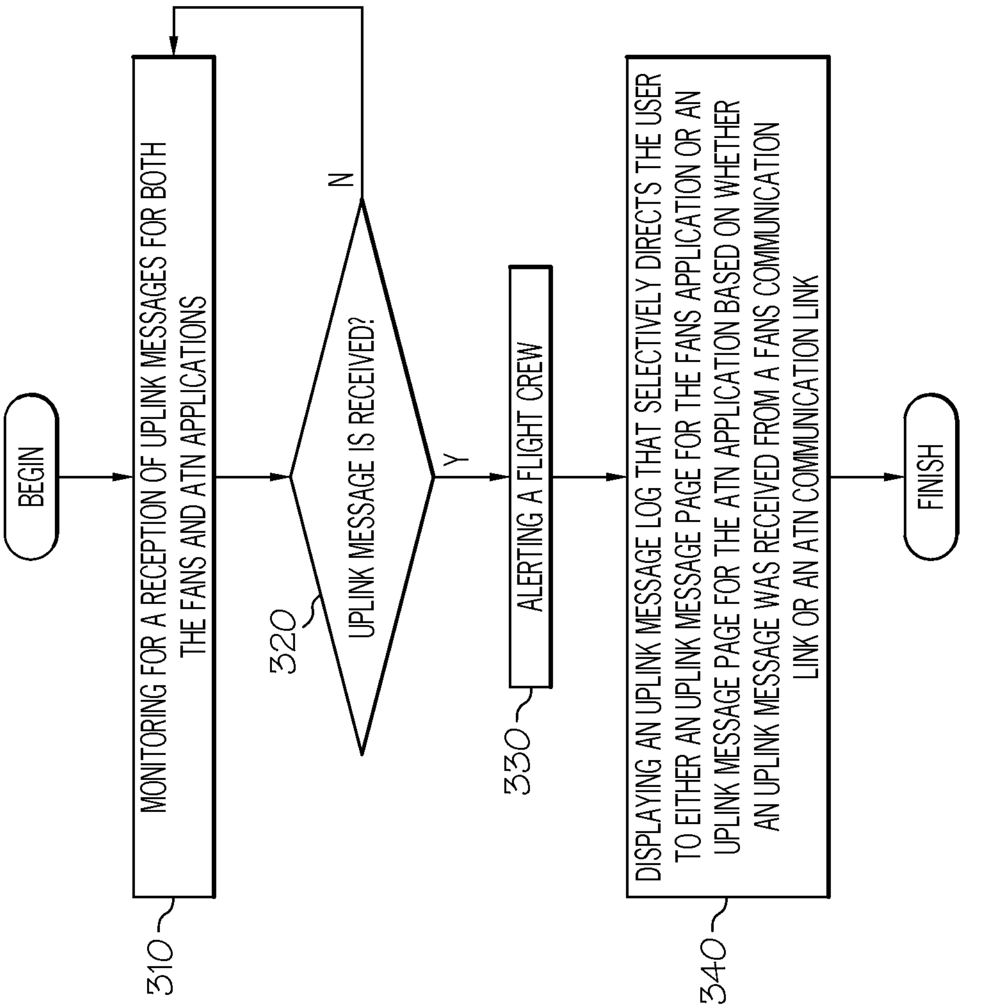
FIG. 3 is a flow chart illustrating a method of one embodiment of the present invention.

FIG. 3 is a flow chart illustrating a method of one embodiment of the present invention for managing uplink messages in an Air Traffic Control (ATC) system. The process begins at 310 with monitoring for a reception of uplink messages for both the FANS and ATN applications. When an uplink message is received (checked at 320), the process proceeds to 330 with alerting a flight crew (by an audible chime, for example) and to 340 with displaying an uplink message log including the uplink message. In other words, the alert notifies the flight crew to access the ATC Manager page that displays the uplink log. The uplink message log selectively directs the user to either an uplink message page for the FANS application or an uplink message page for the ATN application based on whether an uplink CPDLC message was received from a FANS communication link or an ATN communication link. In one embodiment, the uplink message log will indicate which system (FANS or ATN) the uplink was received on. In one embodiment, the method proceeds with displaying to the flight crew the appropriate page driven by either the FANS Application or the ATN Application to view the uplink message. In this way, the flight crew user does not need to determine how the uplink was received before they access the message. They are alerted to the arrival of the message and are directed to the appropriate page to read the message.

Several means are available to implement the systems and methods of the current invention as discussed in this specification. These means include, but are not limited to, digital computer systems, microprocessors, general purpose computers, programmable controllers and field programmable gate arrays (FPGAs). For example, in one embodiment, an ATC Manager is implemented by an FPGA or an ASIC, or an embedded processor. Therefore other embodiments of the present invention are program instructions physically resident on computer readable media devices which when implemented by such means enable them to implement embodiments of the present invention. Computer readable media include any form of a physical computer memory device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A system comprising:

a first processing system including a Future Air Navigation System (FANS) application for implementing a Controller Pilot Data Link Communications (CPDLC) and Aircraft Facility Notification (AFN) system;

a second processing system including an Aeronautical Telecommunication Network (ATN) application for implementing a Protected Mode Controller Pilot Data Link Communications (PM-CPDLC) and Context Management (CM) system;

a third processing system implementing a Human Machine Interface (HMI), the HMI configured to provide access to a first set of pages driven by the FANS application and a second set of pages driven by the ATN application; and an Air Traffic Control (ATC) Manager accessed from the HMI, the HMI configured to provide access to a third set of pages driven by the ATC manager, wherein the third set of pages selectively directs a user of the HMI to either the first set of pages or the second set of pages based on a selected ATC center;

wherein a first page of the third set of pages queries the user for login information, wherein the ATC Manager logs the user into one of the FANS application or the ATN application based on the selected ATC center.

2. The system of claim 1, wherein a first page of the third set of pages queries the user to determine the selected ATC center.

3. The system of claim 1, further comprising:

a navigation receiver for determining an aircraft position, wherein the ATC manager determines the selected ATC center based on the aircraft position.

4. The system of claim 1, further comprising:

a database stored on a data storage device, the database including a listing a ATC centers, the ATC manager coupled to the database;

wherein the third set of pages direct the user to the second set of pages when the database includes an ATN address for the selected ATC center.

5. The system of claim 4, wherein the third set of pages direct the user to the first set of pages when the database does not include an ATN address for the selected ATC center.

6. The system of claim 1, wherein at least one page of the third set of pages displays a log of uplink CPDLC messages.

7. The system of claim 6, wherein, for a first uplink CPDLC message displayed in the log, the ATC manager directs the user to either an uplink message page for the FANS application or an uplink message page for the ATN application based on the whether the first uplink CPDLC message was received from a FANS communication link or an ATN communication link.

8. A system comprising:

one or more processors, the one or more processors including a Future Air Navigation System (FANS) application for providing Controller Pilot Data Link Communications (CPDLC) and Aircraft Facility Notification (AFN) logon over a first communication link and an Aeronautical Telecommunication Network (ATN) application for providing Protected Mode Controller Pilot Data Link Communications (PM-CPDLC) and Context Management (CM) logon over a second communication link;

a Human Machine Interface (HMI) device coupled to the one or more processors, the HMI device configured to provide access to a first set of pages driven by the FANS application and a second set of pages driven by the ATN application;

an Air Traffic Control (ATC) Manager accessed from the HMI device, the HMI device configured to provide access to a third set of pages driven by the ATC manager, wherein the third set of pages selectively directs a user of the HMI device to information from either the first set of pages or the second set of pages based on a selected ATC center; and a database stored on a data storage device, the database including a listing a ATC centers, the ATC manager coupled to the database;

wherein the third set of pages direct the user to the second set of pages when the database includes an ATN address for the selected ATC center.

9. The system of claim 8, further comprising:

a navigation receiver for determining an aircraft position, wherein the ATC manager determines the selected ATC center based on the aircraft position.

10. The system of claim 8, wherein at least one page of the third set of pages displays a log of uplink CPDLC messages.

11. The system of claim 10, wherein the ATC manager directs the user to either an uplink message page for the FANS application or an uplink message page for the ATN application based on the whether an uplink CPDLC message was received from a FANS communication link or an ATN communication link.

12. A method for managing access to an Air Traffic Control (ATC) Controller Pilot Data Link Communications (CPDLC) and logon system, the method comprising:

selecting an Air Traffic Control (ATC) center;

determining whether the ATC center is a Future Air Navigation System (FANS) ATC center or an Aeronautical Telecommunication Network (ATN) ATC center;

providing access via a Human Machine Interface to a first set of pages generated by a FANS application when the ATC center is determined to be a FANS ATC center;

providing access via the Human Machine Interface to a second set of pages generated by an ATN application when the ATC center is determined to be an ATN ATC center; and querying a user to select the ATC center via the Human Machine Interface.

13. The method of claim 12, wherein selecting an Air Traffic Control (ATC) center further comprises determining an aircraft position based on a received navigation signal and selecting the ATC center based on the aircraft position.

14. The method of claim 12, further comprising:

displaying a login page to a user via the Human Machine Interface;

directing login information entered by the user to the FANS application when the ATC center is determined to be a FANS ATC center; and directing login information entered by the user to the ATN application when the ATC center is determined to be an ATN ATC center.

15. The method of claim 12, further comprising:

querying a database stored on a data storage device, the database including a listing a ATC centers;

wherein the ATC center is determined to be an ATN ATC center when the database includes an ATN address for the ATC center.

16. The method of claim 12, further comprising:

displaying a log of uplink CPDLC messages.

17. The method of claim 12 further comprising:

displaying an uplink message log that selectively directs the user to either an uplink message page for the FANS application or an uplink message page for the ATN application based on whether an uplink CPDLC message was received from a FANS communication link or an ATN communication link.

* * * * *